US006109483A

United States Patent [19]

Wilke et al.

[11] Patent Number: 6,109,483

[45] Date of Patent: *Aug. 29, 2000

[54] FILLING MACHINE ASSEMBLY HAVING A MOVEABLE VENT TUBE

[75] Inventors: Wolfgang Wilke, Hoisdorf, Germany; Kecheng Ding, Titusville, Fla.; Jens Naecker, Hamburg, Germany

[73] Assignee: Crown Simplimatic Incorporated, Lynchburg, Va.

[ * ] Notice: This patent is subject to a terminal disclaimer.

[21] Appl. No.: 09/273,188

[22] Filed: Mar. 19, 1999

Related U.S. Application Data

[60] Provisional application No. 60/116,476, Jan. 20, 1999.

[51] Int. Cl.[7] .......................... B65D 88/54; G01F 11/06; G01F 11/30; G01F 11/36; G01F 11/42

[52] U.S. Cl. .......................... 222/309; 141/39; 141/40; 141/47; 141/50; 141/59; 141/192; 141/198; 141/285; 141/296; 141/301; 141/308

[58] Field of Search .......................... 222/309; 141/39, 141/40, 47, 50, 52, 57, 59, 144, 147, 192, 198, 285, 291, 296, 301, 302, 308

[56] References Cited

U.S. PATENT DOCUMENTS

| | | |
|---|---|---|
| 3,595,280 | 7/1971 | Fissel . |
| 3,633,635 | 1/1972 | Kaiser . |
| 4,653,551 | 3/1987 | Sindermann . |
| 4,938,261 | 7/1990 | Petri et al. . |
| 5,000,234 | 3/1991 | Weiss . |

*Primary Examiner*—Henry J. Recla
*Assistant Examiner*—Timothy L. Maust
*Attorney, Agent, or Firm*—Howard & Howard

[57] ABSTRACT

A filling machine assembly (10) for filling a beverage container (12), such as a bottle or can, with a beverage such as carbonated drinks, juice or water. The filling machine (10) includes a support housing (14) for supplying the beverage to be discharged into the container (12). A valve housing (22) is mounted to the bottom of the support housing (14) for controlling the discharge of the beverage and a control device (24) is mounted to the top of the support housing (14). The control device (24) has outer walls (26) defining a working chamber (28) having a top and a bottom. A vent tube (30) has a first end disposed within the working chamber (28) of the control device (24) and a second end extending into the valve housing (22). A piston (38) is secured to the first end of the vent tube (30) within the working chamber (28) for moving the vent tube (30) a predetermined stroke between a filling position and a non-use position. The assembly is characterized by a first input port (70) disposed above the piston (38) at the top of the working chamber (28) and a second input port (72) disposed below the piston (38) at the bottom of the working chamber (28) whereby a fluid medium may pass through the first (70) and second (72) input ports to move the piston (38) and the vent tube (30) between the filling and non-use positions.

17 Claims, 5 Drawing Sheets

FILLING MACHINE ASSEMBLY HAVING A MOVEABLE VENT TUBE

RELATED APPLICATION

This patent application claims priority to and all the benefits of U.S. Provisional Patent Application No. 60/116,476, filed on Jan. 20, 1999 and entitled "Filling Machine Assembly Having a Moveable Vent Tube".

BACKGROUND OF THE INVENTION

1) Technical Field

The subject invention relates to a beverage filling machine for filling a container with a liquid material and having a moveable vent tube for venting gases from the container during the filling process.

2) Description of the Prior Art

Filling mechanisms used for filling containers, such as cans, jars, or bottles, with a beverage, such as carbonated drinks, juices, water or the like, as are well known in the art. Conventional filling mechanisms feed the containers into a star wheel conveyor which individually positions each container on a rotating turntable below a valve assembly of an individual filling machine. The container moves into sealing engagement with the valve assembly by either moving the container upwardly or by lowering the valve assembly. Modem filling machines are known in the art as counter pressure filling machines as is discussed below. There may be as many as 120 individual filling machines disposed circumferentially around the turntable. The filling machines typically include a support housing having an inner fluid chamber or ring bowl disposed above the valve assembly. The ring bowl is usually annular and contains the liquid or beverage for filling the containers and has a space above the liquid for a pressurized inert gas such as carbon dioxide or nitrogen. This space above the liquid is known as the headspace. A common storage tank or reservoir feeds the ring bowl with the required liquid and gas.

In the typical filling operation, the container, which is sealed against the valve assembly, is initially purged with the inert gas from the ring bowl for a predetermined time in order to flush air and other impurities from the container. A vent tube is introduced into the container to accomplish this and other operations. Specifically, the vent tube moves from a non-use position raised above the container to a filling position disposed within the container. The liquid is filled into the container from the ring bowl while the gas from the container vents through the vent tube into the headspace. The liquid will at least partially rise into the vent tube during the filling of the container. The gas pressure in the container and the ring bowl are equalized when filling begins. This is what is known as counter pressure which allows the liquid to flow into the container solely under the influence of gravity. After the container is filled to a desired level, the vent tube rises out of the container. Finally, gas is released from the top of the container to the atmosphere by an process commonly known as "snifting".

The beverage filling industry continuously strives for machinery and methods which facilitate rapid, economical, efficient, and sterile filling of containers. As discussed above, it is common for the vent tube to move in and out of the container during the filling operation. The prior art devices typically utilize complicated mechanical mechanisms for moving the vent tube between the non-use and filling positions during the filling operation. An example of one such device is disclosed in U.S. Pat. No. 3,633,635 to Kaiser. These known devices can be expensive and difficult to maintain. Such mechanical devices could also significantly jeopardize the sterile environment of the filling machines.

A pneumatic device for moving the vent tube has also been contemplated by the prior art. U.S. Pat. No. 3,595,280 to Fissel discloses such a device. The Fissel filling valve utilizes a single air input port for injecting air pressure into a chamber to force a piston downwardly. A spring continuously pushes the piston upward against the force of the air pressure. Hence, the downward movement of the vent tube is controlled by the air pressure and the upward movement is controlled by the air pressure and the spring. This movement of the vent tube, however, could be very difficult to control. Specifically, the desired displacement of the vent tube is dependent upon the biasing force of the spring. Over time the biasing force of the spring may change which would affect the operation of the vent tube. In addition, the pressure within the chamber would preferably be released slowly in order to slowly raise the vent tube. The slow exhausting of the chamber could be difficult manage.

SUMMARY OF THE INVENTION AND ADVANTAGES

A filling machine assembly for filling a container with a fluid material. The assembly comprises a support housing having an upper surface and a lower surface for supplying the fluid material to be discharged into the container. A valve housing is mounted to the lower surface of the support housing for controlling the discharge of the fluid material. A control device is mounted to the upper surface of the support housing and has outer walls defining a working chamber having a top and a bottom. A vent tube has a first end disposed within the working chamber of the control device and a second end extending into the valve housing. A piston is secured to the vent tube within the working chamber of the control device for moving the vent tube a predetermined stroke between a filling position and a non-use position. The assembly is characterized by a first input port disposed above the piston at the top of the working chamber and a second input port disposed below the piston at the bottom of the working chamber whereby a fluid medium may pass through the first and second input ports to move the piston and the vent tube between the filling and non-use positions.

Accordingly, the subject invention provides for a pneumatic adjustment device for the vent tube which can incrementally and accurately control the upward and downward movement of the vent tube. In other words, the stroke of the vent tube can be easily controlled and the speed of the upward and downward movements can also be controlled.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1A:
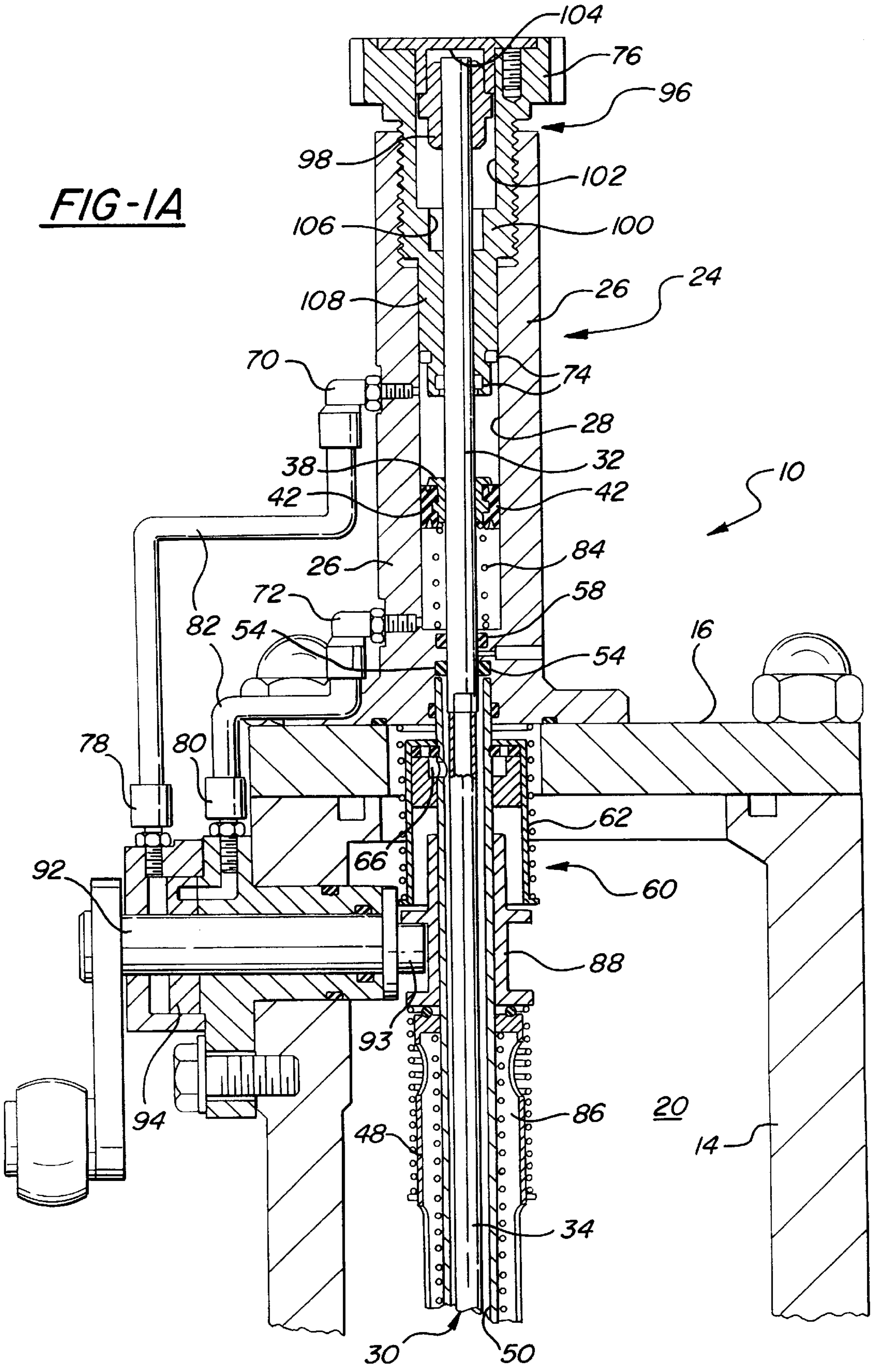
FIG. 1A is a partially cross-sectional view of a top half of a filling machine in a non-use position.
Figure 1B:
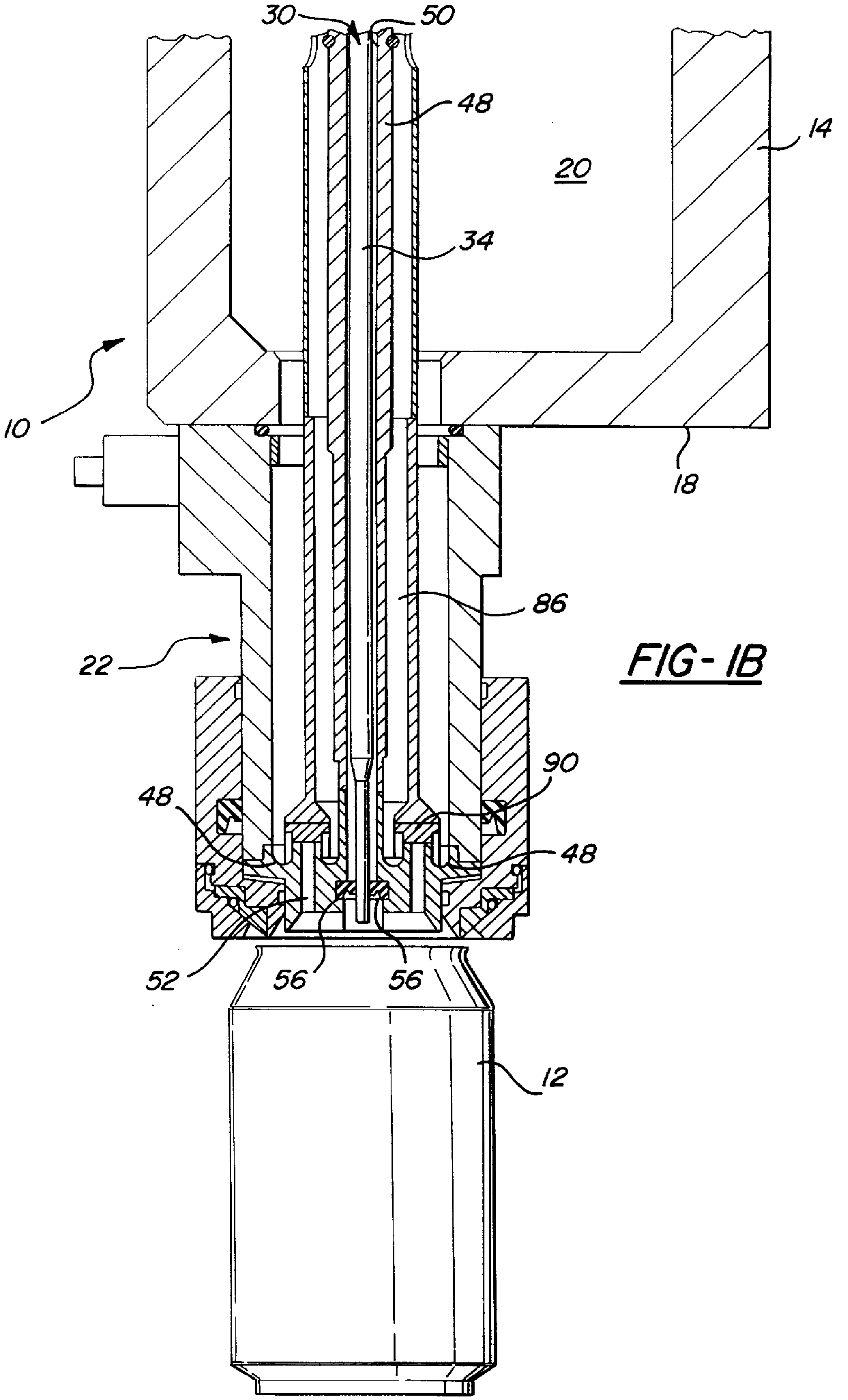
FIG. 1B is a partially cross-sectional view of a bottom half of the filling machine in the non-use position.
Figure 2A:
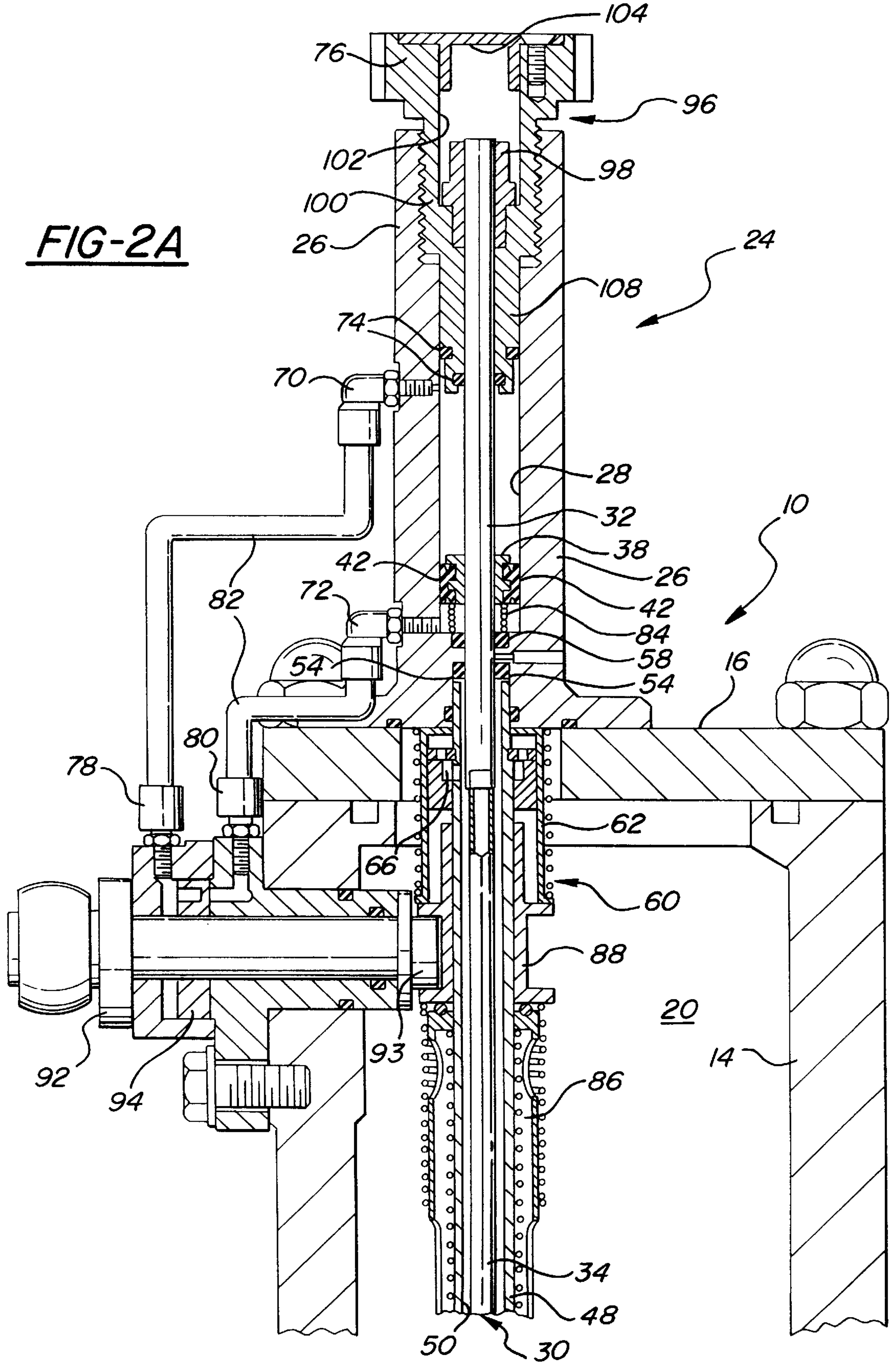
FIG. 2A is a partially cross-sectional view of the top half of the filling machine in a filling position.
Figure 2B:
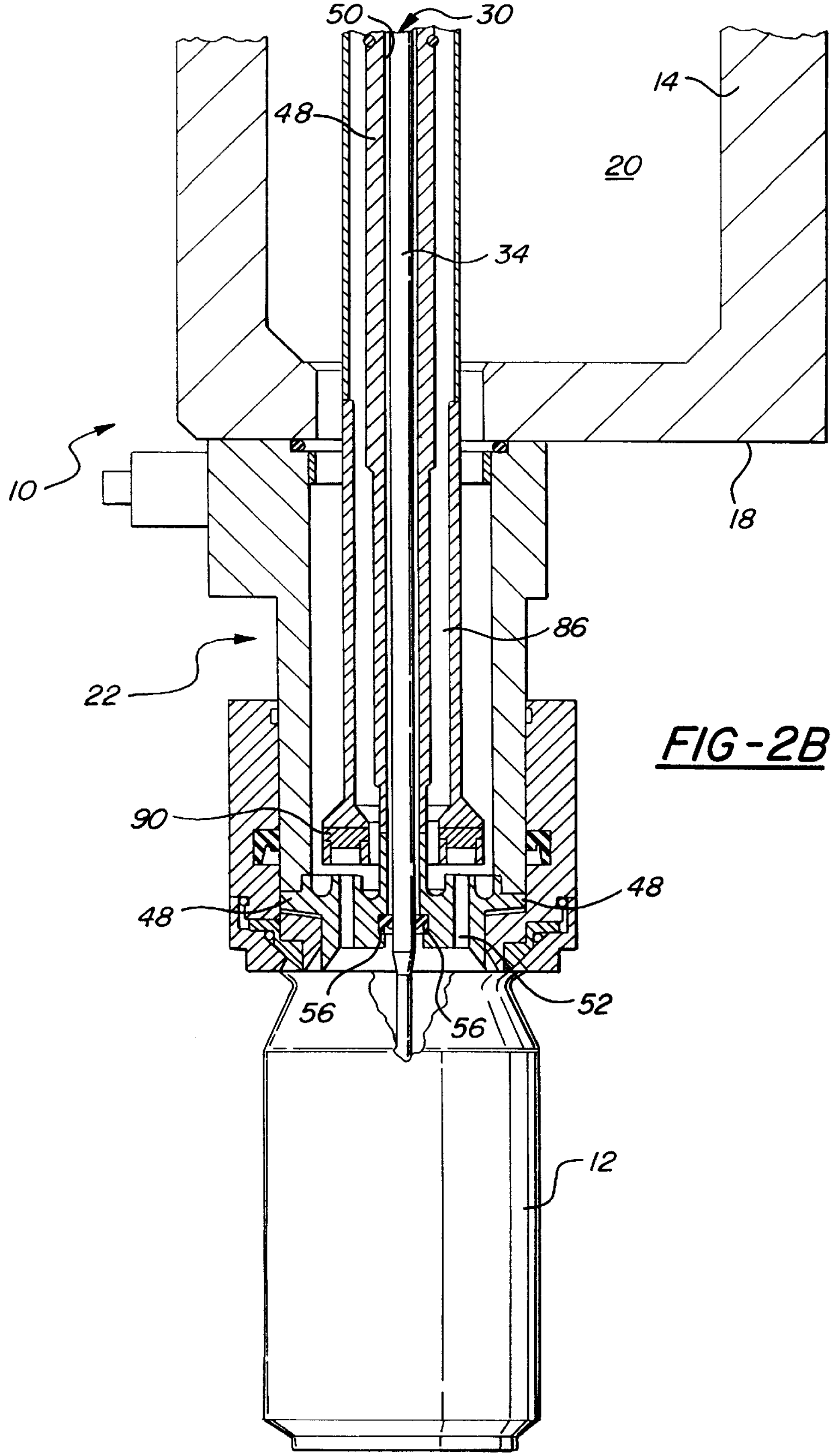
FIG. 2B is a partially cross-sectional view of the bottom half of the filling machine in the filling position.

Referring to the Figures, wherein like numerals indicate like or corresponding parts throughout the several views, a filling machine assembly for filling a container 12 with a fluid material (not shown) is generally shown at 10 in FIGS. 1A through 2B. For illustrative purposes, the filling machine 10 is split into two halves. The top half of the filling machine 10 is shown in FIGS. 1A and 2A and the bottom half of the filling machine 10 is shown in FIGS. 1B and 2B. These figures illustrate the two operating positions of the filling machine 10. FIGS. 1A and 1B show the filling machine 10 in a non-use position and FIGS. 2A and 2B show the filling machine 10 in a filling position. The subject filling machine 10 could fill any type of container 12, such as a can, jar, or bottle, with any type of fluid material, such as a carbonated drink, juice, water or the like, without deviating from the scope of the subject invention. The filling machine 10 shown in the figures is designed to fill a container 12 with a carbonated beverage. For illustrative purposes, the container 12 is depicted as a 12 oz can 12. The filling machine 10 is mounted to a filling mechanism (not shown) which typically includes a series of conveyors, tanks, and support platforms as are well known in the art.

The filling machine assembly 10 comprises a support housing 14 having an upper surface 16 and a lower surface 18 defining an inner fluid chamber 20 for supplying the fluid material to be discharged into the container 12. As appreciated by those skilled in the art, the fluid material, which is preferably a liquid beverage, fills a portion of the inner fluid chamber 20 while leaving a space above the liquid for a pressurized inert gas such as carbon dioxide or nitrogen. For illustrative purposes, supply and return pipes for the liquid and gas as well as the liquid and gas themselves are not shown. Also not shown are support members and a turntable for mounting the filling machine 10 to the filling mechanism. As discussed above and in the background section, the additional operating components of the filling mechanism are known to those skilled in the art. A common storage tank (not shown) feeds the inner fluid chamber 20 with the required liquid and gas.

As generally shown in FIGS. 1B and 2B, a valve housing 22 is mounted to the lower surface 18 of the support housing 14 for controlling the discharge of the fluid material into the container 12. As generally shown in FIGS. 1A and 2A a control device 24 is mounted to the upper surface 16 of the support housing 14 and has outer walls 26 defining a working chamber 28 having a top and a bottom. The valve housing 22 and control device 24 are discussed in greater detail hereinbelow.

Figure 3:
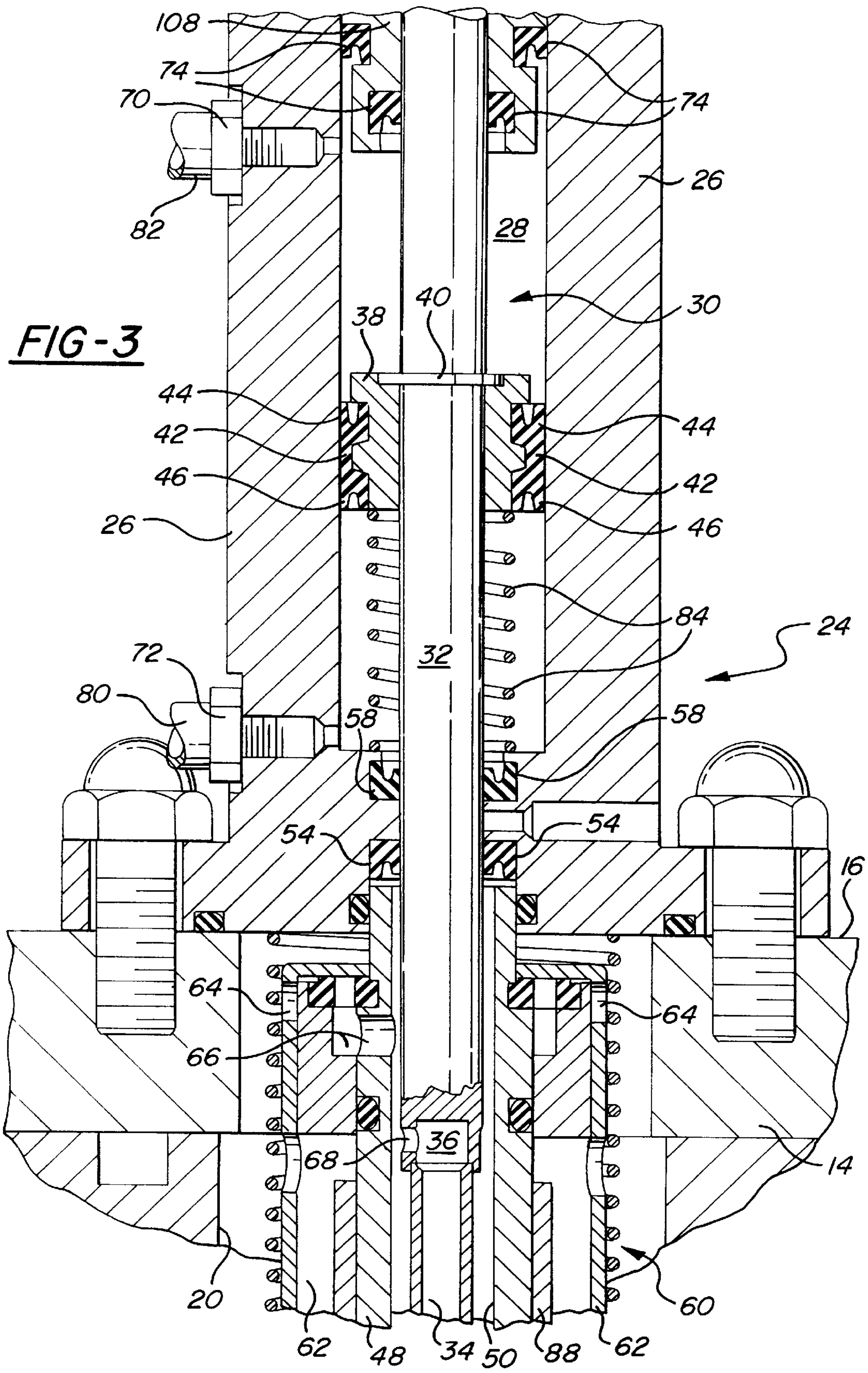
FIG. 3 is an exploded partially cross-sectional view of an interface between a control device and a support housing of the top half of the filling machine.

A vent tube, generally shown at 30, has a first end disposed within the working chamber 28 of the control device 24 and a second end extending into the valve housing 22. The vent tube 30 is at least partially hollow and moves upwardly and downwardly between the non-use and filling positions during the filling process. As also shown in FIG. 3, the vent tube 30 preferably has an upper portion 32 and a lower portion 34 with the two portions 32, 34 welded or otherwise affixed together such that the upper 32 and lower 34 portions operate as a single unit. The upper portion 32 is a solid pipe having a small hollow section 36. The lower portion 34 is entirely hollow and tapers at the distal end thereof. The upper portion 32 extends into the working chamber 28 of the control device 24 and the lower portion 34 extends into the valve housing 22.

A piston 38 is secured to the vent tube 30 within the working chamber 28 of the control device 24 for moving the vent tube 30 a predetermined stroke between the filling position and the non-use position. Specifically, the piston 38 is anchored to the upper portion 32 of the vent tube 30 by a suitable fastening device 40. The piston 38 includes a plurality of seals 42 for sealing engagement of the piston 38 with the outer walls 26 of the working chamber 28. Preferably there is one annular seal 42 surrounding the piston 38 which locks within a pair of annular grooves within the piston 38. The annular seal 42 includes an first seal portion 44 and a second seal portion 46 interconnected together. Each of the seal portions 44, 46 is locked within a corresponding groove within the piston 38. Preferably, the first 44 and second 46 seal portions each have U-shaped configurations with a first leg and a second leg interconnected by a bottom. For illustrative purposes, the first and second legs and the bottom of the seal portions 44, 46 are not numbered. The bottoms of the first 44 and second 46 seal portions face outwardly toward the working chamber 28.

A support tube 48 extends between the control device 24 and the valve housing 22 and has a bore 50 surrounding the vent tube 30. Referring to FIGS. 1B and 2B, the support tube 48 has a lower portion which makes up part of the valve housing 22. The lower portion of the support tube 48 has at least one fluid passageway 52 for allowing the fluid material to pass from the inner fluid chamber 20 into the container 12 during the filling process. The support tube 48 must be rigid enough to withstand the operating pressures within the inner fluid chamber 20. The support tube 48 must also be securely fixed within the support housing 14 in order to support a number of working components as are later discussed.

An upper tube seal 54 is in sealing engagement between the control device 24 and the first end of the vent tube 30 with the bore 50 of the support tube 48 being open to the upper seal 54. A lower tube seal 56 is in sealing engagement between the support tube 48 and the vent tube 30 to seal the bore 50 of the support tube 48 between the upper 54 and lower 56 seals. A chamber tube seal 58 is in sealing engagement between the control device 24 and the first end of the vent tube 30 to seal off the bottom of the working chamber 28. The upper 54, lower 56, and chamber 58 tube seals may be of any suitable design or configuration without deviating from the scope of the subject invention. The upper 54, lower 56, and chamber 58 tube seals support and guide the vent tube 30 within the support tube 48 between the filling and non-use positions.

Referring to FIGS. 1A, 2A, and 3, the filling machine 10 also includes a chamber sealing mechanism, generally shown at 60, which selectively seals the bore 50 between the upper 54 and lower 56 tube seals from the inner fluid chamber 20 to equalize operating pressures against the tube seals 54, 56 during the movement of the vent tube 30. The chamber sealing mechanism 60 includes a moveable plate 62 having a plurality of holes 64. The plate 62 selectively seals an upper passageway 66 which fluidly connects the bore 50 with the inner fluid chamber 20. The vent tube 30 includes an opening 68 for fluid communication between the hollow lower portion 34 of the vent tube 30 and the upper passageway 66. Accordingly, the hollow lower portion 34 of the vent tube 30 is in selective fluid communication with the inner fluid chamber 20. The specifics of the upper 54 and lower 56 tube seals and the chamber sealing mechanism 60 form the subject matter of an independent invention disclosed and claimed in co-pending application Ser. No. 09/272,485 filed concurrently herewith and assigned to the assignee hereof.

The filling machine assembly 10 of the subject invention is characterized by a first input port 70 disposed above the piston 38 at the top of the working chamber 28 and a second input port 72 disposed below the piston 38 at the bottom of the working chamber 28 whereby a fluid medium may pass through the first 70 and second 72 input ports to move the piston 38 and the vent tube 30 between the filling and non-use positions. The first input port 70, second input port 72, working chamber 28, and piston 38 make up an actuation device for moving the vent tube 30 relative to the support tube 48 between the filling and non-use positions.

More specifically, during the downward movement of the vent tube 30 air pressure is passed through the first input port 70 into the working chamber 28 above the piston 38. The air pressure is trapped in this area by the first seal portion 44 of the seals 42 around the piston 38 and seals 74 around the top of the working chamber 28. Preferably, the seals 74 around the top of the working chamber 28 are part of an adjustment nut 76 which is discussed below. At some point the air pressure is large enough to move the vent tube 30 downward as shown in FIG. 2A. During the upward movement of the vent tube 30 air pressure is passed through the second input port 72 into the working chamber 28 below the piston 38. The air pressure is similarly trapped in this area by the second seal portion 46 of the seals 42 around the piston 38 and the chamber tube seal 58. At some point the air pressure is large enough to move the vent tube 30 upward as shown in FIGS. 1A and 3. As appreciated, the when pressurized air is feed into the working chamber 28 below the piston 38, the air pressure within the working chamber 28 above the piston 38 is exhausted. Likewise, when pressurized air is feed into the working chamber 28 above the piston 38 the air pressure within the working chamber 28 below the piston 38 is exhausted. The correlation between the first 70 and second 72 input ports can be incrementally controlled such that the piston 38 can be easily moved upward and downward at any desired rate.

A first output port 78 is connected to the first input port 70 and a second output port 80 is connected to the second input port 72 for supplying the fluid medium to the first 70 and second 72 input ports. The first 78 and second 80 output ports and first 70 and second 72 input ports are connected together by corresponding hoses 82. The first 70 and second 72 input ports, first 78 and second 80 output ports, and hoses 82 may be of any suitable design or configuration as is well known in the art.

A spring 84 is disposed within the working chamber 28 and engages the piston 38 to continuously bias the piston 38 toward the first input port 70. The primary purpose of the spring 84 is to keep the vent tube 30 in the upward non-use position when the filling machine 10 is not in operation. In other words, when there is no air pressure within the working chamber 28 the piston 38 and vent tube 30 will have a tendency to fall downward due to the force of gravity. The spring 84 works against the force of gravity to keep the vent tube 30 in the upward position. It is undesirable to have the vent tube 30 fall downward since the second end of the vent tube 30 would then be projecting out of the valve housing 22 where it could be damaged.

A fluid sealing mechanism 86 is movably mounted with respect to the support tube 48 for controlling the discharge of fluid material. An actuation bracket 88 is slideably disposed on the support tube 48 and mounted to the fluid sealing mechanism 86 for controlling the movement of the fluid sealing mechanism 86. The actuation bracket 88 also selectively engages the plate 62 of the chamber sealing mechanism 60 to move the plate 62 to an open position. Referring to FIGS. 1B and 2B, the fluid sealing mechanism 86 selectively seals with the fluid passageway 52 of the support tube 48 to control the flow of the fluid material. The fluid sealing mechanism 86 is a relatively large tube having a number of openings. The distal end of the fluid sealing mechanism 86 is enlarged in order to retain a liquid seal 90 to effectuate the sealing engagement with the fluid passageway 52. As appreciated by those skilled in the art, the valve housing 22 and fluid sealing mechanism 86 include many additional components to effectuate the operation of the filling process, some of which are not shown. These additional components are not discussed in any greater detail and are well known in the beverage filling art.

An actuation lever 92 is mounted within the support housing 14 and engages the actuation bracket 88 for manipulating the bracket 88 along with the fluid sealing mechanism 86 between an open position, which corresponds to the open position of the plate 62, to discharge the fluid material through the valve housing 22 and a closed position, which corresponds to the closed position of the plate 62, to seal the support housing 14 from the valve housing 22. Specifically, the actuation lever 92 includes an oval cam 93 for engaging and manipulating the actuation bracket 88.

The actuation lever 92 further includes a fluid distribution disc 94 mounted in fluid communication with the first 78 and second 80 output ports to control the distribution of the fluid medium to the first 70 and second 72 input ports. The fluid medium may be any suitable gaseous material such as compressed air. As shown in FIG. 1A the distribution disc 94 is positioned so that the pressurized air passes into the second input port 72 to push the vent tube 30 upward into the non-use position. In FIG. 2A the distribution disc 94 is turned so that the pressurized air passes into the first input port 70 to push the vent tube 30 into the filling position. For illustrative purposes, the inner workings of the actuation lever 92 and the distribution disc 94 are shown schematically. As appreciated there is an air supply source (not shown) and an air evacuation device (not shown) associated with the actuation lever 92. There are also a number of other components associated with the actuation lever 92 that are necessary to effectuate its operation. These components do not form a part of the subject invention and are not discussed in any greater detail.

As best shown in FIGS. 1A and 2A, the control device 24 also includes an adjustment mechanism, generally shown at 96, for adjusting the position of the predetermined stroke. The adjustment mechanism 96 includes a stop block 98 mounted adjacent the first end of the vent tube 30 and the adjustment nut 76. The adjustment nut 76 movably engages the outer walls 26 and slideably supports the stop block 98 for repositioning the stop block 98 and the filling position upon movement of the adjustment nut 76 thereby adjusting the position of the predetermined stroke. Preferably, the stop block 98 is mounted to the upper portion 32 of the vent tube 30 above the first input port 70.

The adjustment nut 76 includes a first portion 100 threadingly engaging the outer walls 26 to facilitate the repositioning of the stop block 98. The first portion 100 of the adjustment nut 76 includes an inner chamber 102 with the adjustment nut 76 slideably supporting the stop block 98 within the inner chamber 102. The inner chamber 102 includes an upper abutment 104 and a lower abutment 106 for selective engagement by the stop block 98 during the movement of the vent tube 30. The adjustment nut 76 further includes a second portion 108 extending from the first portion 100 and having the plurality of seals 74 for sealing engagement with the outer walls 26 and the vent tube 30. As discussed above, the second portion 108 forms a top for the working chamber 28 and the seals 74 prevent the pressurized air within the working chamber 28 from escaping out of the working chamber 28.

As discussed above, the movement of the adjustment nut 76 adjusts the position of the predetermined stroke. More specifically, the adjustment nut 76 adjusts the downward most position of the vent tube 30, i.e., the filling position. In other words, the desired position of the adjustment nut 76 defines the predetermined stroke of the vent tube 30. As appreciated, the movement of the adjustment nut 76 does not affect the distance that the vent tube 30 moves between the filling and non-use positions, i.e., the stroke itself. As also appreciated, the maximum stroke of the vent tube 30 is limited to the size of the inner chamber 102 and the interaction of the stop block 98 with the inner chamber 102. The specifics of the adjustment mechanism 96 form the subject matter of an independent invention disclosed and claimed in co-pending application Ser. No. 09/272,446 filed concurrently herewith and assigned to the assignee hereof.

During operation of the filling machine 10, the container 12 moves along a conveyor (not shown) into position below the valve housing 22. The container 12 is then moved into sealing engagement with the valve housing 22 and the vent tube 30 lowers into the filling position as shown in FIGS. 2A and 2B. Specifically, the vent tube 30 is lowered due to actuation of the actuation lever 92. More specifically, the actuation lever 92 turns the distribution disc 94 which directs pressurized air into the first input port 70 which pushes the piston 38 downwardly. This in turn pushes the vent tube 30 downwardly until the stop block 98 engages the lower abutment 106 within the inner chamber 102 of the adjustment nut 76. The container 12 is purged with the inert gas from the inner fluid chamber 20 in order to flush air and other impurities from the container 12. This is necessary to reduce the possibility of undesirable odors and ineffective filling of the container 12. The actuation lever 92 also lifts the actuation bracket 88 and fluid sealing mechanism 86 to the open position. The upward movement of the actuation bracket 88 pushes upwardly on the plate 62 to open the fluid communication between the vent tube 30 and the inner fluid chamber 20. The upward movement of the fluid sealing mechanism 86 opens the liquid passageway 52. As appreciated, the movement of the actuation lever 92, distribution disc 94, vent tube 30, actuation bracket 88, fluid sealing mechanism 86, and plate 62 is for all practical purposes one simultaneous movement of the filling machine 10 from the non-use position to the filling position.

The liquid can now flow from the inner fluid chamber 20 into the container 12 while the inert gas within the container 12 vents through the vent tube 30 into the top of the inner fluid chamber 20. Specifically, the gas flows from the container 12 into the hollow lower portion 34 of the vent tube 30, through the small hollow section 36 of the upper portion 32 of the vent tube 30, through the opening 68 in the vent tube 30, through the upper passageway 66, through the holes 64 in the plate 62, and into the space above the liquid within the inner fluid chamber 20. The gas pressure in the container 12 and the inner fluid chamber 20 are equalized during the filling process which allows the liquid to flow into the container 12 solely under the influence of gravity. This type of filling procedure is very efficient and reduces the possibility of the beverage foaming.

After the container 12 is filled to the desired level, the actuation lever 92 is actuated to the non-use position as shown in FIGS. 1A and 1B. Specifically, the distribution disc 94 directs pressurized air into the second input port 72 to move the piston 38 upwardly. This also moves the vent tube 30 upwardly until the stop block 98 engages the upper abutment 104 of the inner chamber 102 of the adjustment nut 76. The actuation lever 92 moves the actuation bracket 88 downwardly which reengages the plate 62 to seal the upper passageway 66. This in turn seals the bore 50 and vent tube 30 from the inner fluid chamber 20. The downward movement of the actuation bracket 88 also moves the fluid sealing mechanism 86 into sealing engagement with the valve housing 22, i.e., the closed position. As discussed above, the movement of the actuation lever 92, distribution disc 94, vent tube 30, actuation bracket 88, fluid sealing mechanism 86, and plate 62 is for all practical purposes one simultaneous movement of the filling machine 10 from the filling position back to the non-use position. Finally, gas is released from the top of the container 12 to the atmosphere as is well known in the art. The filled container 12 is transported away from the filling machine 10 via a conveyor (not shown) and the filling machine 10 is now ready to repeat the above described filling operation.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be any way limiting, the invention may be practiced otherwise than as specifically described.

What is claimed is:

1. A filling machine assembly (10) for filling a container (12) with a fluid material, said assembly comprising:

a support housing (14) having an upper surface (16) and a lower surface (18) for supplying the fluid material to be discharged into the container (12);

a valve housing (22) mounted to said lower surface (18) of said support housing (14) for controlling the discharge of the fluid material;

a control device (24) mounted to said upper surface (16) of said support housing (14) and having outer walls (26) defining a working chamber (28) having a top and a bottom;

a vent tube (30) having a first end disposed within said working chamber (28) of said control device (24) and a second end extending into said valve housing (22); and a piston (38) secured to said vent tube (30) within said working chamber (28) of said control device (24) for moving said vent tube (30) a predetermined stroke between a filling position and a non-use position;

said assembly characterized by a first input port (70) disposed above said piston (38) at said top of said working chamber (28) and a second input port (72) disposed below said piston (38) at said bottom of said working chamber (28) whereby a fluid medium may pass through said first (70) and second (72) input ports to move said piston (38) and said vent tube (30) between said filling and non-use positions.

2. An assembly as set forth in claim 1 wherein said piston (38) includes a plurality of seals (42) for sealing engagement of said piston (38) with said outer walls (26) of said working chamber (28).

3. An assembly as set forth in claim 2 further including a spring (84) disposed within said working chamber (28) and engaging said piston (38) to continuously bias said piston (38) toward said first input port (70).

4. An assembly as set forth in claim 2 wherein said control device (24) includes an adjustment mechanism (96) for adjusting the position of said predetermined stroke.

5. An assembly as set forth in claim 4 wherein said adjustment mechanism (96) includes a stop block (98) mounted adjacent said first end of said vent tube (30) and an adjustment nut (76) movably engaging said outer walls (26) and slideably supporting said stop block (98) for repositioning said stop block (98) and said filling position upon movement of said adjustment nut (76) thereby adjusting said position of said predetermined stroke.

6. An assembly as set forth in claim 5 wherein said adjustment nut (76) includes a first portion (100) threadingly engaging said outer walls (26) to facilitate said repositioning of said stop block (98).

7. An assembly as set forth in claim 6 wherein said adjustment nut (76) further includes a second portion (108) extending from said first portion (100) and having a plurality of seals (74) for sealing engagement with said outer walls (26).

8. An assembly as set forth in claim 2 further including a support tube (48) extending between said control device (24) and said valve housing (22) and surrounding said vent tube (30).

9. An assembly as set forth in claim 8 further including an upper tube seal (54) in sealing engagement between said control device (24) and said first end of said vent tube (30).

10. An assembly as set forth in claim 9 further including a lower tube seal (56) in sealing engagement between said support tube (48) and said vent tube (30).

11. An assembly as set forth in claim 10 wherein said upper (54) and lower (56) tube seals support and guide said vent tube (30) within said support tube (48) between said filling and non-use positions.

12. An assembly as set forth in claim 8 further including a fluid sealing mechanism (86) movably mounted with respect to said support tube (48) for controlling the discharge of fluid material.

13. An assembly as set forth in claim 12 further including an actuation bracket (88) mounted to said fluid sealing mechanism (86) for controlling said movement of said fluid sealing mechanism (86).

14. An assembly as set forth in claim 13 further including an actuation lever (92) mounted within said support housing (14) and engaging said actuation bracket (88) for manipulating said bracket (88) along with said fluid sealing mechanism (86) between an open position which discharges the fluid material through said valve housing (22) and a closed position which seals said support housing (14) from said valve housing (22).

15. An assembly as set forth in claim 14 wherein said actuation lever (92) includes an oval cam (93) for engaging and manipulating said actuation bracket (88).

16. An assembly as set forth in claim 15 further including a first output port (78) connected to said first input port (70) and a second output port (80) connected to said second input port (72) for supplying the fluid medium to said first (70) and second (72) input ports.

17. An assembly as set forth in claim 16 wherein said actuation lever (92) further includes an fluid distribution disc (94) mounted in fluid communication with said first (78) and second (80) output ports to control the distribution of fluid to the first (70) and second (72) input ports.

* * * * *